United States Patent
Park et al.

(10) Patent No.: US 8,743,797 B2
(45) Date of Patent: Jun. 3, 2014

(54) METHOD OF ALLOCATING RADIO RESOUCES IN A WIRELESS COMMUNICATION SYSTEM

(75) Inventors: Sung Jun Park, Anyang-si (KR); Young Dae Lee, Anyang-si (KR); Seung June Yi, Anyang-si (KR); Sung Duck Chun, Anyang-si (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 12/733,179

(22) PCT Filed: Sep. 12, 2008

(86) PCT No.: PCT/KR2008/005425
§ 371 (c)(1),
(2), (4) Date: Apr. 7, 2010

(87) PCT Pub. No.: WO2009/035301
PCT Pub. Date: Mar. 19, 2009

(65) Prior Publication Data
US 2010/0265896 A1    Oct. 21, 2010

Related U.S. Application Data

(60) Provisional application No. 60/971,921, filed on Sep. 13, 2007, provisional application No. 60/973,442, filed on Sep. 18, 2007, provisional application No. 60/974,072, filed on Sep. 20, 2007, provisional application No. 60/975,582, filed on Sep. 27, 2007, provisional application No. 60/976,766, filed on Oct. 1, 2007, provisional application No. 61/039,095, filed on Mar. 24, 2008.

(30) Foreign Application Priority Data

Sep. 11, 2008 (KR) .................. 10-2008-0089719

(51) Int. Cl.
*H04W 72/04* (2009.01)
*H04W 28/06* (2009.01)

(52) U.S. Cl.
CPC .......... *H04W 72/0413* (2013.01); *H04W 28/06* (2013.01)
USPC ........................................ 370/329

(58) Field of Classification Search
CPC .......................... H04W 72/0413; H04W 28/06
USPC .................................. 370/335, 349; 714/748
See application file for complete search history.

(56) References Cited

U.S. PATENT DOCUMENTS 5,802,064 A     9/1998  Lieberman
(Continued)

FOREIGN PATENT DOCUMENTS

CN            1314747           9/2001
(Continued)

OTHER PUBLICATIONS

Ericsson, Nokia Corporation, Nokia Siemens Networks, Qualcomm Europe, Samsung, NTT DoCoMo, Inc, "Framework for Scheduling Request and Buffer Status reporting", Nov. 5-9, 2007, TSG-RAN WG2 Meeting #60, R2-074691.*
(Continued)

*Primary Examiner* — Joseph Bednash
(74) *Attorney, Agent, or Firm* — McKenna Long & Aldridge LLP

(57) ABSTRACT

A method of allocating radio resources in a wireless communication system is disclosed. In one aspect of the present invention, in a wireless communication system, a user equipment requests a base station to allocate radio resources for uplink data transmission of at least one time in accordance with a first radio resource allocation request mode. The user equipment requests the base station to allocate the radio resources for uplink data transmission in accordance with a second radio resource allocation request mode if a predetermined condition is satisfied.

4 Claims, 12 Drawing Sheets

(56) References Cited

U.S. PATENT DOCUMENTS

| | | | |
|---|---|---|---|
| 5,878,041 A | 3/1999 | Yamanaka et al. | |
| 6,445,917 B1 | 9/2002 | Bark et al. | |
| 6,557,135 B1 | 4/2003 | Balachandran et al. | |
| 6,594,240 B1 | 7/2003 | Chuah et al. | |
| 6,594,244 B1 | 7/2003 | Chang et al. | |
| 6,628,946 B1 | 9/2003 | Wiberg et al. | |
| 6,728,918 B1 | 4/2004 | Ikeda et al. | |
| 6,738,624 B1 | 5/2004 | Aksentijevic et al. | |
| 6,788,944 B2 | 9/2004 | Jiang | |
| 6,862,450 B2 | 3/2005 | Mikola et al. | |
| 6,874,113 B2 | 3/2005 | Chao et al. | |
| 6,967,936 B1 | 11/2005 | Laroia et al. | |
| 6,987,985 B2 | 1/2006 | Purkayastha et al. | |
| 7,009,940 B2 | 3/2006 | Vialen et al. | |
| 7,171,163 B2 | 1/2007 | Terry et al. | |
| 7,180,885 B2 | 2/2007 | Terry | |
| 7,227,857 B2 | 6/2007 | Kuo | |
| 7,227,868 B2 | 6/2007 | Inden | |
| 7,295,573 B2 | 11/2007 | Yi et al. | |
| 7,313,116 B2 | 12/2007 | Lee et al. | |
| 7,400,593 B2 | 7/2008 | Choi et al. | |
| 7,450,933 B2 | 11/2008 | Kwak et al. | |
| 7,486,699 B2 | 2/2009 | Yi et al. | |
| 7,525,908 B2 | 4/2009 | Olsson et al. | |
| 7,706,410 B2 | 4/2010 | Chun et al. | |
| 7,710,930 B2 | 5/2010 | Kwak | |
| 7,817,595 B2 | 10/2010 | Wu | |
| 7,876,771 B2 | 1/2011 | Bergstrom et al. | |
| 7,894,444 B2 | 2/2011 | Lohr et al. | |
| 7,978,616 B2 | 7/2011 | Chun et al. | |
| 8,027,321 B2 | 9/2011 | Zheng | |
| 8,027,363 B2 | 9/2011 | Chun et al. | |
| 8,031,689 B2 | 10/2011 | Guo | |
| 8,059,597 B2 | 11/2011 | Park et al. | |
| 8,081,662 B2 | 12/2011 | Chun et al. | |
| 8,130,687 B2 | 3/2012 | Cai et al. | |
| 8,160,012 B2 | 4/2012 | Chun et al. | |
| 8,190,144 B2 | 5/2012 | Chun et al. | |
| 8,203,988 B2 | 6/2012 | Chun et al. | |
| 8,243,931 B2 | 8/2012 | Yi et al. | |
| 2002/0001314 A1 | 1/2002 | Yi et al. | |
| 2002/0009999 A1 | 1/2002 | Lee et al. | |
| 2002/0024972 A1 | 2/2002 | Yi et al. | |
| 2002/0114280 A1 | 8/2002 | Yi et al. | |
| 2002/0122411 A1* | 9/2002 | Zimmerman et al. | 370/349 |
| 2003/0007490 A1 | 1/2003 | Yi et al. | |
| 2003/0099305 A1 | 5/2003 | Yi et al. | |
| 2003/0194992 A1 | 10/2003 | Kim et al. | |
| 2004/0003106 A1 | 1/2004 | Cunningham et al. | |
| 2004/0008659 A1 | 1/2004 | Kim | |
| 2004/0022213 A1 | 2/2004 | Choi et al. | |
| 2004/0076182 A1 | 4/2004 | Wu | |
| 2004/0103435 A1 | 5/2004 | Yi et al. | |
| 2004/0117860 A1 | 6/2004 | Yi et al. | |
| 2004/0146019 A1 | 7/2004 | Kim et al. | |
| 2004/0147236 A1 | 7/2004 | Parkvall et al. | |
| 2004/0148396 A1 | 7/2004 | Meyer et al. | |
| 2004/0153852 A1 | 8/2004 | Wu | |
| 2004/0156330 A1 | 8/2004 | Yi et al. | |
| 2004/0184438 A1 | 9/2004 | Terry | |
| 2004/0208160 A1 | 10/2004 | Petrovic et al. | |
| 2004/0223507 A1 | 11/2004 | Kuchibhotla et al. | |
| 2004/0229626 A1 | 11/2004 | Yi et al. | |
| 2004/0235447 A1 | 11/2004 | Gronberg et al. | |
| 2005/0020260 A1 | 1/2005 | Jeong et al. | |
| 2005/0026597 A1 | 2/2005 | Kim et al. | |
| 2005/0039101 A1 | 2/2005 | Torsner | |
| 2005/0041663 A1 | 2/2005 | Jiang | |
| 2005/0041681 A1 | 2/2005 | Lee et al. | |
| 2005/0042987 A1 | 2/2005 | Lee et al. | |
| 2005/0047416 A1 | 3/2005 | Heo et al. | |
| 2005/0054365 A1 | 3/2005 | Ahn et al. | |
| 2005/0063347 A1 | 3/2005 | Sarkkinen et al. | |
| 2005/0083943 A1 | 4/2005 | Lee et al. | |
| 2005/0094596 A1 | 5/2005 | Pietraski et al. | |
| 2005/0096017 A1 | 5/2005 | Kim | |
| 2005/0100048 A1 | 5/2005 | Chun et al. | |
| 2005/0105499 A1 | 5/2005 | Shinozaki et al. | |
| 2005/0118992 A1 | 6/2005 | Jeong et al. | |
| 2005/0147040 A1 | 7/2005 | Vayanos et al. | |
| 2005/0164683 A1 | 7/2005 | Roberts et al. | |
| 2005/0169293 A1 | 8/2005 | Zhang et al. | |
| 2005/0192021 A1 | 9/2005 | Lee et al. | |
| 2005/0193309 A1 | 9/2005 | Grilli et al. | |
| 2005/0201354 A1 | 9/2005 | Hosaka et al. | |
| 2005/0213605 A1 | 9/2005 | Kim et al. | |
| 2005/0237932 A1 | 10/2005 | Liu | |
| 2005/0237960 A1 | 10/2005 | Kim | |
| 2005/0237972 A1 | 10/2005 | Van Dervelde et al. | |
| 2005/0238051 A1 | 10/2005 | Yi et al. | |
| 2005/0249141 A1 | 11/2005 | Lee et al. | |
| 2005/0250526 A1 | 11/2005 | Lindoff et al. | |
| 2005/0254467 A1 | 11/2005 | Li et al. | |
| 2005/0259662 A1 | 11/2005 | Kim et al. | |
| 2005/0286483 A1 | 12/2005 | Lee et al. | |
| 2005/0287957 A1 | 12/2005 | Lee et al. | |
| 2006/0007886 A1 | 1/2006 | Lee et al. | |
| 2006/0030342 A1 | 2/2006 | Hwang et al. | |
| 2006/0056441 A1 | 3/2006 | Jiang | |
| 2006/0067238 A1 | 3/2006 | Olsson et al. | |
| 2006/0067289 A1 | 3/2006 | Lee et al. | |
| 2006/0067364 A1 | 3/2006 | Jung et al. | |
| 2006/0072494 A1 | 4/2006 | Matusz | |
| 2006/0072503 A1 | 4/2006 | Kim et al. | |
| 2006/0084389 A1 | 4/2006 | Beale et al. | |
| 2006/0092972 A1 | 5/2006 | Petrovic et al. | |
| 2006/0098574 A1 | 5/2006 | Yi et al. | |
| 2006/0128312 A1 | 6/2006 | Declerck et al. | |
| 2006/0142020 A1 | 6/2006 | Mueckenheim et al. | |
| 2006/0154603 A1 | 7/2006 | Sachs et al. | |
| 2006/0154680 A1 | 7/2006 | Kroth et al. | |
| 2006/0165045 A1 | 7/2006 | Kim et al. | |
| 2006/0182065 A1 | 8/2006 | Petrovic et al. | |
| 2006/0203780 A1* | 9/2006 | Terry | 370/335 |
| 2006/0233200 A1 | 10/2006 | Fifield et al. | |
| 2006/0251027 A1 | 11/2006 | Chun et al. | |
| 2006/0251105 A1 | 11/2006 | Kim et al. | |
| 2006/0264179 A1 | 11/2006 | Bonneville et al. | |
| 2006/0268798 A1 | 11/2006 | Kim et al. | |
| 2006/0274690 A1 | 12/2006 | Chun et al. | |
| 2006/0281456 A1 | 12/2006 | Roberts et al. | |
| 2007/0041397 A1 | 2/2007 | Hwang | |
| 2007/0047452 A1 | 3/2007 | Lohr et al. | |
| 2007/0047493 A1 | 3/2007 | Park et al. | |
| 2007/0053309 A1* | 3/2007 | Poojary et al. | 370/256 |
| 2007/0060139 A1 | 3/2007 | Kim et al. | |
| 2007/0079207 A1* | 4/2007 | Seidel et al. | 714/748 |
| 2007/0081468 A1 | 4/2007 | Timus | |
| 2007/0081513 A1 | 4/2007 | Torsner | |
| 2007/0091810 A1 | 4/2007 | Kim et al. | |
| 2007/0097913 A1 | 5/2007 | Hanov | |
| 2007/0117579 A1 | 5/2007 | Cai et al. | |
| 2007/0133456 A1 | 6/2007 | Ding | |
| 2007/0177628 A1 | 8/2007 | Choi et al. | |
| 2007/0178878 A1 | 8/2007 | Ding | |
| 2007/0183358 A1 | 8/2007 | Cai | |
| 2007/0189205 A1 | 8/2007 | Terry et al. | |
| 2007/0201397 A1 | 8/2007 | Zhang | |
| 2007/0206530 A1 | 9/2007 | Lee et al. | |
| 2007/0206531 A1 | 9/2007 | Pajukoski et al. | |
| 2007/0223526 A1 | 9/2007 | Jiang | |
| 2007/0258591 A1 | 11/2007 | Terry et al. | |
| 2007/0268861 A1 | 11/2007 | Diachina et al. | |
| 2007/0274278 A1 | 11/2007 | Choi et al. | |
| 2007/0287440 A1 | 12/2007 | Benkert et al. | |
| 2007/0297360 A1 | 12/2007 | Joachim et al. | |
| 2007/0297367 A1 | 12/2007 | Wang et al. | |
| 2008/0002688 A1 | 1/2008 | Kim et al. | |
| 2008/0008152 A1 | 1/2008 | Lohr et al. | |
| 2008/0043658 A1 | 2/2008 | Worrall | |
| 2008/0043670 A1 | 2/2008 | Marinier | |
| 2008/0045224 A1 | 2/2008 | Lu et al. | |
| 2008/0045272 A1 | 2/2008 | Wang et al. | |
| 2008/0049682 A1 | 2/2008 | Ding et al. | |

(56) References Cited

U.S. PATENT DOCUMENTS

| | | |
|---|---|---|
| 2008/0051098 A1 | 2/2008 | Rao |
| 2008/0059859 A1 | 3/2008 | Marinier et al. |
| 2008/0069108 A1 | 3/2008 | Yi et al. |
| 2008/0081598 A1 | 4/2008 | Chandra et al. |
| 2008/0084851 A1 | 4/2008 | Kim et al. |
| 2008/0089285 A1 | 4/2008 | Pirskanen et al. |
| 2008/0101609 A1 | 5/2008 | Jiang |
| 2008/0146242 A1 | 6/2008 | Alanara et al. |
| 2008/0165717 A1 | 7/2008 | Chen et al. |
| 2008/0165755 A1 | 7/2008 | Marinier et al. |
| 2008/0182609 A1 | 7/2008 | Somasundaram et al. |
| 2008/0186936 A1 | 8/2008 | Chun et al. |
| 2008/0186944 A1 | 8/2008 | Suzuki et al. |
| 2008/0186946 A1 | 8/2008 | Marinier et al. |
| 2008/0198869 A1 | 8/2008 | Jiang |
| 2008/0212561 A1 | 9/2008 | Pani et al. |
| 2008/0212605 A1 | 9/2008 | Jiang |
| 2008/0232396 A1 | 9/2008 | Buckley et al. |
| 2008/0233940 A1 | 9/2008 | Jen |
| 2008/0233941 A1 | 9/2008 | Jen |
| 2008/0261581 A1 | 10/2008 | Cai |
| 2008/0268878 A1 | 10/2008 | Wang et al. |
| 2008/0273482 A1 | 11/2008 | Lee et al. |
| 2008/0273610 A1 | 11/2008 | Malladi et al. |
| 2008/0305819 A1 | 12/2008 | Chun et al. |
| 2008/0310395 A1 | 12/2008 | Kashima |
| 2008/0318578 A1 | 12/2008 | Worrall |
| 2009/0005058 A1 | 1/2009 | Kazmi et al. |
| 2009/0016301 A1 | 1/2009 | Sammour et al. |
| 2009/0041240 A1 | 2/2009 | Parkvall et al. |
| 2009/0046631 A1 | 2/2009 | Meylan et al. |
| 2009/0046667 A1* | 2/2009 | Pelletier et al. ............... 370/335 |
| 2009/0046695 A1 | 2/2009 | Jiang |
| 2009/0104890 A1 | 4/2009 | Wang et al. |
| 2009/0116434 A1 | 5/2009 | Lohr et al. |
| 2009/0119564 A1 | 5/2009 | Sagfors et al. |
| 2009/0156194 A1 | 6/2009 | Meylan |
| 2009/0175163 A1 | 7/2009 | Sammour et al. |
| 2009/0175253 A1 | 7/2009 | Wu et al. |
| 2009/0190480 A1 | 7/2009 | Sammour et al. |
| 2009/0232076 A1 | 9/2009 | Kuo |
| 2009/0259908 A1 | 10/2009 | Gollapudi |
| 2009/0305712 A1 | 12/2009 | Franceschini et al. |
| 2009/0323574 A1 | 12/2009 | Koskinen |
| 2010/0014466 A1 | 1/2010 | Meyer et al. |
| 2010/0091750 A1 | 4/2010 | Lee et al. |
| 2010/0128648 A1 | 5/2010 | Lee et al. |
| 2010/0142429 A1 | 6/2010 | Yi et al. |
| 2010/0142457 A1 | 6/2010 | Chun et al. |
| 2010/0157904 A1 | 6/2010 | Ho et al. |
| 2010/0172282 A1 | 7/2010 | Zhang et al. |
| 2010/0232335 A1 | 9/2010 | Lee et al. |
| 2010/0260140 A1 | 10/2010 | Zhu |
| 2011/0019604 A1 | 1/2011 | Chun et al. |
| 2011/0033048 A1 | 2/2011 | Stanwood et al. |

FOREIGN PATENT DOCUMENTS

| | | |
|---|---|---|
| CN | 1339903 | 3/2002 |
| CN | 1349360 | 5/2002 |
| CN | 1390425 | 1/2003 |
| CN | 1396780 | 2/2003 |
| CN | 1549610 A | 11/2004 |
| CN | 1613210 | 5/2005 |
| CN | 1642067 A | 7/2005 |
| CN | 1643820 A | 7/2005 |
| CN | 1761260 A | 4/2006 |
| CN | 1761356 A | 4/2006 |
| CN | 1792048 | 6/2006 |
| CN | 1846365 A | 10/2006 |
| CN | 1868157 A | 11/2006 |
| CN | 1918825 A | 2/2007 |
| CN | 1938969 A | 3/2007 |
| CN | 1954521 | 4/2007 |
| CN | 1997227 | 7/2007 |
| CN | 101047966 A | 10/2007 |
| CN | 101090281 A | 12/2007 |
| EP | 1 035 745 A1 | 9/2000 |
| EP | 1263160 | 12/2002 |
| EP | 1326397 | 7/2003 |
| EP | 1 343 267 | 9/2003 |
| EP | 1 508 992 | 2/2005 |
| EP | 1 509 011 A2 | 2/2005 |
| EP | 1557967 A1 | 7/2005 |
| EP | 1638237 | 3/2006 |
| EP | 1655879 A1 | 5/2006 |
| EP | 1 689 130 | 8/2006 |
| EP | 1 695 462 A1 | 8/2006 |
| EP | 1 746 855 | 1/2007 |
| EP | 1 768 297 | 3/2007 |
| EP | 1 796 405 | 6/2007 |
| EP | 2026523 | 2/2009 |
| EP | 2108223 | 10/2009 |
| JP | 06-053921 | 2/1994 |
| JP | 07-162948 | 6/1995 |
| JP | 2000-324161 | 11/2000 |
| JP | 2001-197021 | 7/2001 |
| JP | 2002-198895 A | 7/2002 |
| JP | 2003-018050 | 1/2003 |
| JP | 2003-115796 | 4/2003 |
| JP | 2003-115876 | 4/2003 |
| JP | 2003-229925 | 8/2003 |
| JP | 2003-283592 | 10/2003 |
| JP | 2005-073276 | 3/2005 |
| JP | 2006-054718 | 2/2006 |
| JP | 2006-505209 | 2/2006 |
| JP | 2006-514466 | 4/2006 |
| JP | 2006-121562 | 5/2006 |
| JP | 2006-311543 | 11/2006 |
| JP | 2007-116639 | 5/2007 |
| JP | 2008-520125 | 6/2008 |
| JP | 2009-513058 | 3/2009 |
| JP | 2009-521893 | 6/2009 |
| JP | 2010518683 A | 5/2010 |
| KR | 10-2001-0045783 | 6/2001 |
| KR | 10-2001-0062306 | 7/2001 |
| KR | 10-2002-0004645 | 1/2002 |
| KR | 10-2002-0097304 | 12/2002 |
| KR | 10-2003-0012048 | 2/2003 |
| KR | 10-2003-0060055 | 7/2003 |
| KR | 10-2003-0068743 | 8/2003 |
| KR | 10-2003-0087914 A | 11/2003 |
| KR | 10-2004-0034398 | 4/2004 |
| KR | 10-2004-0039944 | 5/2004 |
| KR | 10-2004-0072961 | 8/2004 |
| KR | 10-2005-0022988 | 3/2005 |
| KR | 10-2005-0062359 | 6/2005 |
| KR | 10-2005-0081836 | 8/2005 |
| KR | 10-2005-0092874 | 9/2005 |
| KR | 10-2005-0099472 | 10/2005 |
| KR | 10-2005-0100882 | 10/2005 |
| KR | 10-2005-0103127 A | 10/2005 |
| KR | 10-2006-0004935 | 1/2006 |
| KR | 10-2006-0014910 | 2/2006 |
| KR | 10-2006-0029452 | 4/2006 |
| KR | 10-2006-0042858 | 5/2006 |
| KR | 10-2006-0069378 | 6/2006 |
| KR | 10-2006-0079784 | 7/2006 |
| KR | 10-2006-0090191 | 8/2006 |
| KR | 10-2006-0134058 | 12/2006 |
| KR | 10-2007-0048552 | 5/2007 |
| KR | 10-2007-0076374 | 7/2007 |
| KR | 10-0907978 | 7/2009 |
| KR | 10-2009-0084756 | 8/2009 |
| RU | 2291594 C2 | 1/2007 |
| RU | 2304348 | 8/2007 |
| TW | 496058 | 7/2002 |
| WO | 99/37114 A2 | 7/1999 |
| WO | 01/22645 | 3/2001 |
| WO | WO 01/37473 | 5/2001 |
| WO | 01/67664 A2 | 9/2001 |
| WO | 02/45453 A1 | 6/2002 |
| WO | WO 03/045103 | 5/2003 |

(56) References Cited

FOREIGN PATENT DOCUMENTS

| WO | 2004/042964 A1 | 5/2004 |
|---|---|---|
| WO | WO 2004/042953 A1 | 5/2004 |
| WO | WO 2004/042963 | 5/2004 |
| WO | WO2004/102838 | 11/2004 |
| WO | 2005022814 A1 | 3/2005 |
| WO | WO 2005/039108 | 4/2005 |
| WO | WO 2005/078967 A1 | 8/2005 |
| WO | WO2005/109671 | 11/2005 |
| WO | WO 2005/122441 A1 | 12/2005 |
| WO | WO 2005/125226 | 12/2005 |
| WO | WO 2006/009714 | 1/2006 |
| WO | WO 2006/016785 | 2/2006 |
| WO | WO 2006/033521 | 3/2006 |
| WO | WO 2006/046894 | 5/2006 |
| WO | WO 2006/052086 | 5/2006 |
| WO | 2006075820 A1 | 7/2006 |
| WO | WO 2006/083149 | 8/2006 |
| WO | WO 2006/095385 | 9/2006 |
| WO | 2006104773 A1 | 10/2006 |
| WO | WO 2006/104335 | 10/2006 |
| WO | WO 2006/104342 | 10/2006 |
| WO | WO 2006/116620 | 11/2006 |
| WO | WO 2006/118418 | 11/2006 |
| WO | WO 2006/118435 | 11/2006 |
| WO | WO 2007/020070 A2 | 2/2007 |
| WO | WO 2007/023364 | 3/2007 |
| WO | WO 2007/024065 | 3/2007 |
| WO | WO 2007/039023 | 4/2007 |
| WO | WO 2007/045505 | 4/2007 |
| WO | WO 2007/052900 | 5/2007 |
| WO | WO 2007/052921 | 5/2007 |
| WO | WO 2007/066900 | 6/2007 |
| WO | WO 2007/078142 | 7/2007 |
| WO | WO 2007/078156 A2 | 7/2007 |
| WO | WO 2007/078164 | 7/2007 |
| WO | WO 2007/078173 | 7/2007 |
| WO | WO 2007/078174 A1 | 7/2007 |
| WO | WO 2007/079085 | 7/2007 |
| WO | 2007/091838 A1 | 8/2007 |
| WO | WO 2007/089797 | 8/2007 |
| WO | WO 2007/126793 | 11/2007 |
| WO | WO 2007-078174 A1 | 12/2007 |
| WO | WO 2007/147431 | 12/2007 |
| WO | WO 2008/004725 A1 | 1/2008 |
| WO | WO 2008/010063 A2 | 1/2008 |
| WO | 2008/060097 A1 | 5/2008 |
| WO | WO 2008/094120 | 8/2008 |
| WO | WO 2009/035301 | 3/2009 |

OTHER PUBLICATIONS

Motorola, "Syncronized Random Access Channel and Scheduling Request", Nov. 6-10, 2006, 3GPP TSG RAN1#47, R1-063046.*
Ericsson, "Basic Principles for the Scheduling Request in LTE", Aug. 28-Sep. 1, 2006, 3GPP TSG RAN WG2 #54, R2-062350.*
NTT DoCoMo, Fujitsu, Mitsubishi Electric, NEC, Sharp, Toshiba Corporation, "Scheduling Request Transmission Method for E-UTRA Uplink", Nov. 6-10, 2006, 3GPP TSG RAN WG1 Meeting #47, R1-063301.*
Ericsson, "Scheduling Request in U-TRAN", Jan. 15-19, 2007, 3GPP TSG-RAN WG2 #47bis, R1-070471.*
Ericsson, "Scheduling Request in E-UTRAN", 3GPP TSG-RAN #47bis, R1-070471, Jan. 15-19, 2007, entire document.*
Qualcomm Europe, "Further Details on RACH Procedure", 3GPP TSG-RAN WG1 #48, R1-070649, Jan. 12-16, 2007, entire document.*
NTT DoCoMo, Inc., "Buffer Status Report and Scheduling Request triggers", 3GPP TSG-RAN WG2 #59, R2-073574, Aug. 20-24, 2007, entire document.*
3GPP TS 36.321 V8.2.0 (May 2008), 3rd Generation Partnership Project; Technical Specification Group Radio Access Network; Evolved Universal Terrestrial Radio Access (E-UTRA) Medium Access Control (MAC) protocol specification (Release 8), Jun. 17, 2008.*

3GPP TSG-RAN WG2 Meeting #67, Shenzen, China, Aug. 24-28, 2009, R2-095152.*
LG Electronics, "Resource Request in Synchronized Case", TSG-RAN Working Group 2#52, R2-061018, Athens, Greece, Mar. 27-31, 2005.*
LG Electronics, "Discussion of Message 4 in Random Access", 3GPP TSG-RAN WG2 #59, R2-073354, Athens, Greece, Aug. 20-24, 2007.*
Panasonic, "Random Access design for E-UTRA uplink", 3GPP TSG-RAN WG1 Meeting#45, R1-061114, Shanghai, China, May 8-12, 2006.*
NTT DoCoMo, "Random Access Channel Structure for E-UTRA Uplink", 3GPP TSG-RAN WG1 and WG2 Joint Meeting, R2-061064, Athens, Greece, Mar. 27-31, 2006.*
Samsung, "Optimzation of contention Resolution in a RACH", 3GPP TSG-RAN WG2#58bis, R2-072797, Orlando, USA, Jun. 25-29, 2007.*
Motorola et al., "E-UTRA Random Access Channel TP from email discussion", 3GPP TSG-RAN1#44bis, R1-060885, Athens, Greece, Mar. 30, 2006.*
NEC et al. "Need for MAC contention-resolution for non-initial access", 3GPP TSG-RAN Wg2 Meeting #59, R2-073092, Athens, Greece, Aug. 20-24, 2007.*
Ericsson, "Text proposal on scheduling request triggering criterions for LTE", 3GPP TSG-RAN Wg2 #59, Athens, Greece, Aug. 20-24, 2007.*
Ghosh, A. et al.; "Random Access Design for UMTS Air-Interface Evolution"; Vehicular Technology Conference, 2007. VTC2007— Spring IEEE 65th; Apr. 22-25, 2007; pp. 1041-1045.
Sadayuki Abeta et al., "Super 3G Technology Trends. Part 2: Research on Super 3G Technology", NTT DoCoMo Technical Journal, vol. 8, No. 3, pp. 55-62, Dec. 2006, See Section 3; Figure 5.
Nokia, "System Information Distribution", 3GPP TSG-RAN WG2 Ad Hoc Meeting on LTE, R2-061487, Cannes, France, pp. 1-3, Jun. 27-30, 2006, See Section 2.
LG Electronics, "Delivery of LTE System Information", 3GPP TSG-RAN WG2 Ad Hoc on LTE, R2-061959, Cannes, France, pp. 1-4, Jun. 27-30 2006, See Section 3.
NEC: "Optimised buffer status reporting" 3GPP TSG-RAN WG2#58BIS Meeting, Orlando USA, Jun. 25-29, 2007; Jun. 25, 2007, vol. R2-072515 (Jun. 20, 2007), pp. 1-6, XP002503220.
Catt, Ritt: "Consideration on UL buffer reporting" 3GPP TSG-RAN WG2 #55, R2-062934 (Oct. 9, 2006), pp. 1-3, XP002513924 ISSN: 9 URL:http://www.3gpp.org/ftp/tsg_ran/WG2_RL2/TSGR2_55/Documents/.
Wang et al., U.S. Appl. No. 60/976,139.
Sammour et al. U.S. Appl. No. 61/019,058.
ZTE: "redundant retransmission restraint in RLC-AM", 3GPP Draft; R2-021234, 3$^{rd}$ Generation Partnership Project (3GPP), Mobile Competence Centre; 650, Route Des Lucioles, F-06921 Sophia-Antipolis Cedex; France, vol. RAN WG2, no. Shanghai, China; May 3, 2006, XP050131180.
"Digital cellular telecommunications system (Phase2+); Functional stage 2 description of Location Services (LCS) in GERAN (3GPP TS 43.059 version 7.3.0 release 7); ETSI TS 143 059" ETSI Standards, LIS, Sophia Antipolis Cedex, France, vol. 3-G1, No. V7.3.0, May 1, 2007, XP014038519.
LG Electronics Inc: "UE State Transition in LTE_ACTIVE", 3 GPP TSG-RAN WG2 #52; Athens, Greece; Mar. 2006.
Texas Instruments: "UL Synchronization Management and Maintenance in E-UTRA"; Kobe, Japan; May 2007.
Texas Instruments: "UL Synchronization Management in LTE_AC-TIVE"; St. Julians, Malta; Mar. 2007.
Motorola: "Contention-Free Intra-LTE Handover"; St. Louis, USA; Feb. 2007.
Ericsson: "Scheduling Request in E-UTRAN"; Sorrento, Italy; Jan. 2007.
Reuven Cohen: "An Improved SSCOP-like Scheme for Avoiding Unnessary Retransmissions and Achieving Ideal Throughput", Conference on Computer Communications, Fifteenth Annual Joint conference of the IEEE computer and communications societies, Mar. 24-28, 1996, vol. 2, pp. 855-862, XP010158150.

(56) References Cited

OTHER PUBLICATIONS

LG Electronics Inc.: "Correction of status reporting coding", 3GPP TSG RAN WG2 61, R2-080969, Feb. 5, 2008, pp. 1-3, XP002624626.
Alcatel-Lucent: "PDCP status report carrying LIS only", 3GPP Draft; R2-080902, 3$^{rd}$ Generation Partnership Project (3GPP), Mobile Competence Centre; 650, Route Des Lucioles; F-06921 Sophia-Antipolis Cedex; France, vol. RAN WG2, no. Sorrento, Italy; 20080204, Feb. 4, 2008, XP050138711.
"3$^{rd}$ Generation Partnership Project; Technical Specification Group Radio Access Network; Evolved Universal Terrestrial Radio Access (E-UTRA); Packet data Convergence Protocol (PDCP) specification (Release 8)", F-06921, XP050377638.
"Correction to PDCP Status Report", 3GPP TSG RAN WG2 61bis, R2-081594, Mar. 24, 2008, pp. 1-8, XP002624627.
3GPP TS 36.322, V8.0.0, Dec. 2007, 3$^{rd}$ Generation Partnership Project; Technical Specification Group Radio Access Network; Evolved Universal Terrestrial Radio Access (E-UTRA) Radio Link Control (RLC) protocol specification (Release 8).
Change Request, Miscellaneous corrections to TS 36.322, 3GPP TSG-RAN2 Meeting #61, Shenzhen, China, Mar. 31-Apr. 4, 2008, R2-081700.
Ericsson: "Clarification to the handling of large RLC status reports", Change Request, 3GPP TSG-RAN2 Meeting #61bis, Shenzhen, China, Mar. 31-Apr. 4, 2008, R2-082018.
LG Electronics et al. "ACK_SN setting for short Status PDU", 3GPP TSG-RAN WG2 #62, May 5-9, 2008, Kansas City, Missouri, R2-082133.
QUALCOMM Europe: "Scheduling request mechanism", 3GPP TSG-RAN WG1 #48bis, Mar. 30, 2007, R1-071276.
Texas Instruments: "Scheduling Request and DRX in E-UTRA", 3GPP TSG RAN WG1 #49bis, Jun. 29, 2007, R1-072859.
Nokia Siemens Networks: "Update on Security, System Information, Mobility, MAMS and DRX", 3GPP TG-RAN2 Meeting #59, Aug. 31, 2007, R2-073863.
Ericsson: "SDU discard", 3GPP, Aug. 24, 2007, R2-073230.
3GPP TSG-RAN WG2 Meeting #60 R2-074701, RLC status report format, Ericsson, Nov. 9, 2007.
Qualcomm Europe, "UL Requests", 3GPP TSG-RAN WG1 #47bis, Jan. 15-19, 2007, Sorrento, Italy, R1-070426.
Jiang, ASUSTeK Computer Inc., "HFN de-synchronization detection with integrity protection scheme in a wireless communications system", U.S. Appl. No. 60/863,800.
Itri, "Buffer Status Reporting with Group Combining for LTE", 3GPP TSG-RAN WG2, Meeting #58bis, Orlando, Florida, Jun. 25-29, 2007, R2-072833.
NEC, "Considerations on Scheduling Information", 3GPP TSG RAN WG2#59, Athens, Greece, Aug. 20-24, 2007, R2-073556.
LG Electronics Inc., "Correction to polling procedure", 3GPP TSG-RAN WG2 #61 bis, Mar. 31-Apr. 4, 2008, Shenzhen, China, R2-081588.
"Universal Mobile Telecommunications System (UMTS); Radio Link Control (RLC) protocol specification", ETSI TS 322, v4.10.0, Sep. 2003, Release 4.
ASUSTek, "Summary of HFN de-synchronization problem off-line email discussion", 3GPP TSG RAN WG2 #46 Tdoc R2-050318, Feb. 2005.
ASUSTek, "On-line recovery of HFN synchronization due to RLC UM SS problem", 3GPP TSG-RAN WG2 Meeting #44 R2-041940, Oct. 2004.
3GPP TS 36.321 E-UTRA MAC protocol specification, 3GPP TS 36.321 v1.0.0, Sep. 2007 RP-070689.
Motorola, "MAC Header format", 3GPP TSF RAN2, Meeting #59bis, Oct. 8-12, 2007, R2-074419.
NTT DoCoMo et al. "MAC PDU structure for LTE", 3GPP TSG RAN WG2 #59 bis, Oct. 8-12, 2007, R2-074174.
3GPP TSG RAN WG2 #59bis LTE User Plane session report, 3GPP R2-074536, Oct. 12, 2007.
3GPP TS 25.321 Medium Access Control protocol specification, 3GPP TS25.321 v7.5.0, Jun. 2007.
LG Electronics, "Update of eUtran PDCP specification", 3GPP TSG-RAN2 Meeting #61, Sorrento, Italy, 2008, R2-081390.
Amitava Ghosh et al., "Random Access Design for UMTS Air-Interface Evolution", Networks and Enterprise Business, Motorola, 2007 IEEE, pp. 1041-1045.
LG Electronics Inc., "Discussion on BCCH update", 3GPP TSG-RAN WG2 #58bis, Jun. 25-29, 2007, Orlando, FL, R2-072736.
Catt, "Notification scheme for system information change", 3GPP TSG-RAN WG2 #58, May 7-11, 2007, Kobe, Japan, R2-071870.
NTT DoCoMo Inc., "Uplink synchronization maintenance", 3GPP TSG RAN WG2 #58, May 7-11, 2007, Kobe, Japan, R2-072014.
Alcatel-Lucent, Format for RACH Message 2, R2-080176, 3GPP Jan. 1, 2008.
Motorola, Design of backoff scheme for LTE, R2-070143, 3GPP, Jan. 19, 2007.
MAC Rapporteurs (Ericsson, Qualcomm Europe), E-UTRA MAC protocol specification update, R2-080631, 3GPP, Jan. 18, 2008.
3rd Generation Partnership project; Technical Specification Group Radio Access Network; Radio Link Control(RLC) protocol specification (Release 6), 3GPP Draft; XP050129441, Oct. 17, 2005.
Qinqing Zhang et al: "Performance of UMTS radio link control", Proceedings of IEEE International Conference on Communications, pp. 3346-3350, XP010590089, Apr. 28, 2002.
Romain Masson: "E-UTRA RACH within the LTE system", Thesis Submitted in Fulfillment of the Requirements for the Award of The Degree Master of Engineering Research From The University of Lausanne, School of Electrical, Computer and Telecommunications Engineering, CH, Feb. 3, 2006, pp. 1-82, XP002448009.
LG Electronics Inc: "R2-073043 RACH procedure", GPP TSG-RAN WG2 #59, Athens, Greece, No. R2-073043, Aug. 19, 2007, pp. 1-3, XP002515770.
3GPP Draft; R2-080189 LTE_RA_BO_RO, 3rd Generation Partnership Project (3GPP), Jan. 7, 2008, XP050138064.
"3rd Generation Partnership Project; Technical Specification Group Radio Access Network; Evolved Universal Terrestrial Radio Access (E-UTRA) Medium Access Control (MAC) Protocol Specification (Release 8)", 3GPP TS 36.321 V8.0.0, Dec. 1, 2007, pp. 1-23, XP002520880.
Qualcomm Europe, General Corrections to RLC, R2-011701, 3GPP, Jul. 13, 2001.
LG Electronics Inc, Out-of-sequence problem in AM RLC: Discretely discarded SDUs, R2-011206, 3GPP, May 25, 2001.
LG Electronics: "Overall control signaling structure for generic LTE TDD." 3GPP Draft:—TDD Control Signaling, 3rd Generation Partnership Project (3GPP), Mobile Competence Centre ; 650, Route Des Lucioles ; F-06921 Sophia-Antipolis Cedex; France, vol. RAN WG1, no. Beijing, China; Apr. 17, 2007, XP050111754, R1-071848.
Siemens: "Signaling in DL for uplink resource allocation", 3GPP Draft; 3rd Generation Partnership Project (3GPP), Mobile Competence Centre ; 650, Route Des Lucioles ; F-06921 Sophia-Antipolis CEDEX ; France, vol. RAN WG1, no. Shanghai, China; May 2, 2006, XP050102168; R1-061290.
(1) 3rd Generation Partnership Project; Technical Specification Group Radio Access Network; Radio Link Control(RLC) protocol specification (Release 7), 3GPP TS 25.322, No. V7.3.0, pp. 1-81, XP05367795, Jun. 1, 2007.
"Universal Mobile Telecommunications System (UMTS); Radio Resource Control (RRC) protocol specification"; (3GPP TS 25.331 version 6.6.0 Release 6); France; 2005-2006.
NTT DoCoMo: "Uplink synchronization", 3GPP TSG RAN WG2 #57, Feb. 12-16, 2007; XP002713200, R2-070781, Feb. 12, 2007, pp. 1-3.
Samsung: "MAC functions: ARQ", 3GPP TSG-RAN2 Meeting #51, XP002488423, R2-060374, Feb. 13, 2006, pp. 1-5.
Nokia: "System Information Change Indication", 3GPP Draft; R2-071739 System Information Change Indication, 3rd Generation Partnership Project (3GPP), Mobile Competence Centre ; 650, Route Des Lucioles ; F-06921 Sophia-Antipolis Cedex ; France, vol. RAN WG2, no. Kobe, Japan; May 7-11, 2007, May 4, 2007, pp. 1-3, XP050603021.

(56) References Cited

OTHER PUBLICATIONS

Qualcomm Europe, L2 improvements and polling, 3GPP TSG-RAN WG2 Meeting #58 R2-072021, May 11, 2007.
Ericsson: "Random Access Procedures for LTE", 3GPP Draft; R2-060866, 3rd Generation Partnership Project (3GPP), XP050131007, Mar. 23, 2006.
Motorola: "LTE Random Access Procedure", 3GPP TSG-RAN WG2, R2-061463, XP007905045, May 8, 2006.
Nokia Corporation et al: "MAC header format, R2-073891", 3rd Generation Partnership Project (3GPP); XP002602993, Oct. 8, 2007.
MAC Rapporteurs: "Text Proposal for MAC agreements", 3GPP Draft; R2-074531, 3rd Generation Partnership Project(3GPP), XP050137058, Oct. 17, 2007.
"Handling of HFN de-synchronization", 3GPP Draft; R2-074746 Handling of HFN Desynchronization, 3rd Generation Partnership Project(3GPP), XP050137261, Nov. 12, 2007.

* cited by examiner (a)

(b)

METHOD OF ALLOCATING RADIO RESOUCES IN A WIRELESS COMMUNICATION SYSTEM

This application is a National Stage Entry of International Application No. PCT/KR2008/005425, filed on Sep. 12, 2008, and claims priority to Korean Patent Application No. 10-2008-0089719, filed Sep. 11, 2008, along with U.S. Provisional Application No. 60/971,921, filed Sep. 13, 2007, U.S. Provisional Application No. 60/973,442, filed Sep. 18, 2007, U.S. Provisional Application No. 60/974,072, filed Sep. 20, 2007, U.S. Provisional Application No. 60/975,582, filed Sep. 27, 2007, U.S. Provisional Application No. 60/976,766, filed Oct. 1, 2007, and U.S. Provisional Application No. 61/039,095, filed Mar. 24, 2008, each of which is hereby incorporated by reference in its entirety as if fully set forth herein.

TECHNICAL FIELD

The present invention relates to a wireless communication system, and more particularly, to a method of allocating radio resources in a wireless communication system.

BACKGROUND ART

In a wireless communication system which uses multiple carriers, such as an orthogonal frequency division multiple access (OFDMA) or a single carrier-frequency division multiple access (SC-FDMA), radio resources are a set of continuous sub-carriers and are defined by a time-frequency region on a two-dimensional sphere. A time-frequency region is a rectangular form sectioned by time and sub-carrier coordinates. In other words, one time-frequency region could be a rectangular form sectioned by at least one symbol on a time axis and a plurality of sub-carriers on a frequency axis. Such a time-frequency region can be allocated to an uplink for a specific user equipment (UE), or a base station can transmit the time-frequency region to a specific user equipment in a downlink. In order to define such a time-frequency region on the two-dimensional sphere, the number of OFDM symbols and the number of continuous sub-carriers starting from a point having an offset from a reference point should be given.

An evolved universal mobile telecommunications system (E-UMTS) which is currently being discussed uses 10 ms radio frame comprising 10 sub-frames. Namely, one sub-frame includes two continuous slots. One slot has a length of 0.5 ms. Also, one sub-frame comprises a plurality of OFDM symbols, and a part (for example, first symbol) of the plurality of OFDM symbols can be used for transmission of L1/L2 control information.

FIG. 1 illustrates an example of a structure of physical channels used in the E-UMTS. In FIG. 1, one sub-frame comprises an L1/L2 control information transmission region (hatching part) and a data transmission region (non-hatching part).

FIG. 2 illustrates a general method of transmitting data in the E-UMTS. In the E-UMTS, a hybrid auto repeat request (HARQ) scheme, which is one of data retransmission schemes, is used to improve throughput, thereby enabling desirable communication.

Referring to FIG. 2, the base station transmits downlink scheduling information (hereinafter, referred to as 'DL scheduling information') through DL L1/L2 control channel, for example, a physical downlink control channel (PDCCH), to transmit data to a user equipment in accordance with the HARQ scheme. The DL scheduling information includes user equipment identifier (UE ID) or group identifier (group ID) of user equipments, location and duration (resource assignment and duration of assignment) information of radio resources allocated for transmission of downlink data, modulation mode, payload size, transmission parameters such as MIMO related information, HARQ process information, redundancy version, and new data indicator.

In order to notify that DL scheduling information is transmitted through the PDCCH for what user equipment, the user equipment identifier (or group identifier), for example, a radio network temporary identifier (RNTI) is transmitted. The RNTI can be classified into a dedicated RNTI and a common RNTI. The dedicated RNTI is used for data transmission and reception to and from a user equipment of which information is registered with a base station. The common RNTI is used if communication is performed with user equipments, which are not allocated with dedicated RNTI as their information is not registered with the base station. Alternatively, the common RNTI is used for transmission and reception of information used commonly for a plurality of user equipments, such as system information. For example, examples of the common RNTI include RA-RNTI and T-C-RNTI, which are used during a random access procedure through a random access channel (RACH). The user equipment identifier or group identifier can be transmitted in a type of CRC masking in DL scheduling information transmitted through the PDCCH.

User equipments located in a specific cell monitor the PDCCH through the L1/L2 control channel using their RNTI information, and receive DL scheduling information through the corresponding PDCCH if they successfully perform CRC decoding through their RNTI. The user equipments receive downlink data transmitted thereto through a physical downlink shared channel (PDSCH) indicated by the received DL scheduling information.

As described above, in order to efficiently use limited radio resources in the wireless communication system, uplink scheduling and downlink scheduling are performed. Particularly, in the system which uses multiple carriers such as OFDMA or SC-FDMA, since a radio resource block formed by a specific time zone and a specific frequency band can be used by only one user equipment, scheduling, which determines how many radio resources are allocated to each user equipment and also determines when the radio resources are allocated to each user equipment, is very important.

For scheduling, the user equipment can perform a buffer status report (BSR) and a channel resource request. The user equipment can allow a network to efficiently perform scheduling by notifying the network of data stored in its buffer, through the buffer status report. The network can perform proper scheduling by identifying what user equipment needs how many radio resources, using the buffer status report. Meanwhile, the user equipment can actively request the network to allocate radio resources.

DISCLOSURE OF THE INVENTION

A buffer status report and a channel resource request performed by a user equipment are very important for proper scheduling. Accordingly, the buffer status report and the channel resource request need to be performed without any error. If an error occurs during the buffer status report and the channel resource request performed by the user equipment, radio resources will not be allocated to the user equipment during scheduling. Since the user equipment is not allocated with radio resources in spite of data to be transmitted, the user equipment fails to perform smooth communication.

Accordingly, the present invention is directed to a method of allocating radio resources in a wireless communication system, which substantially obviates one or more problems due to limitations and disadvantages of the related art.

An object of the present invention is to provide a method of allocating radio resources in a wireless communication system, in which radio resources can efficiently be used in the wireless communication system.

Another object of the present invention is to provide a method of allocating radio resources in a wireless communication system, in which reliability in a buffer status report and a channel resource request performed by a user equipment can be enhanced in the wireless communication system.

It is to be understood that the technical solutions to be achieved by the present invention will not be limited to the aforementioned descriptions, and other technical solutions will be apparent to those skilled in the art to which the present invention pertains, from the following detailed description of the present invention.

In one aspect of the present invention, in a wireless communication system, a user equipment requests a base station to allocate radio resources for uplink data transmission of at least one time in accordance with a first radio resource allocation request mode. The user equipment requests the base station to allocate the radio resources for uplink data transmission in accordance with a second radio resource allocation request mode if a predetermined condition is satisfied.

In another aspect of the present invention, in a wireless communication system, a user equipment transmits a first buffer status report to a base station, the first buffer status report indicating a buffer status of a user equipment. The user equipment triggers a transmission procedure of a second buffer status report in case that allocation information indicating allocation of radio resources for uplink data transmission is not received until a predetermined time elapses after the first buffer status report is transmitted. At this time, the transmission procedure of the second buffer status report can be performed through a random access procedure or a transmission procedure of a scheduling request (SR) channel.

According to the present invention, radio resources can efficiently be used in the wireless communication system, and reliability in the buffer status report and the channel resource request performed by the user equipment can be enhanced.

The advantages of the present invention will not be limited to the aforementioned description, and it is to be understood that advantages not described will be apparent to those skilled in the art to which the present invention pertains, from the description of the present invention.

BRIEF DESCRIPTION OF THE DRAWINGS

FIG. 5A and FIG. 5B are diagrams illustrating a structure of a radio interface protocol between a user equipment (UE) and E-UTRAN, in which FIG. 5A is a schematic view of a control plane protocol and FIG. 5B is a schematic view of a user plane protocol;

BEST MODE FOR CARRYING OUT THE INVENTION

Hereinafter, structures, operations, and other features of the present invention will be understood readily by the preferred embodiments of the present invention, examples of which are illustrated in the accompanying drawings. Embodiments described later are examples in which technical features of the present invention are applied to an E-UMTS (Evolved Universal Mobile Telecommunications System).

Figure 1:
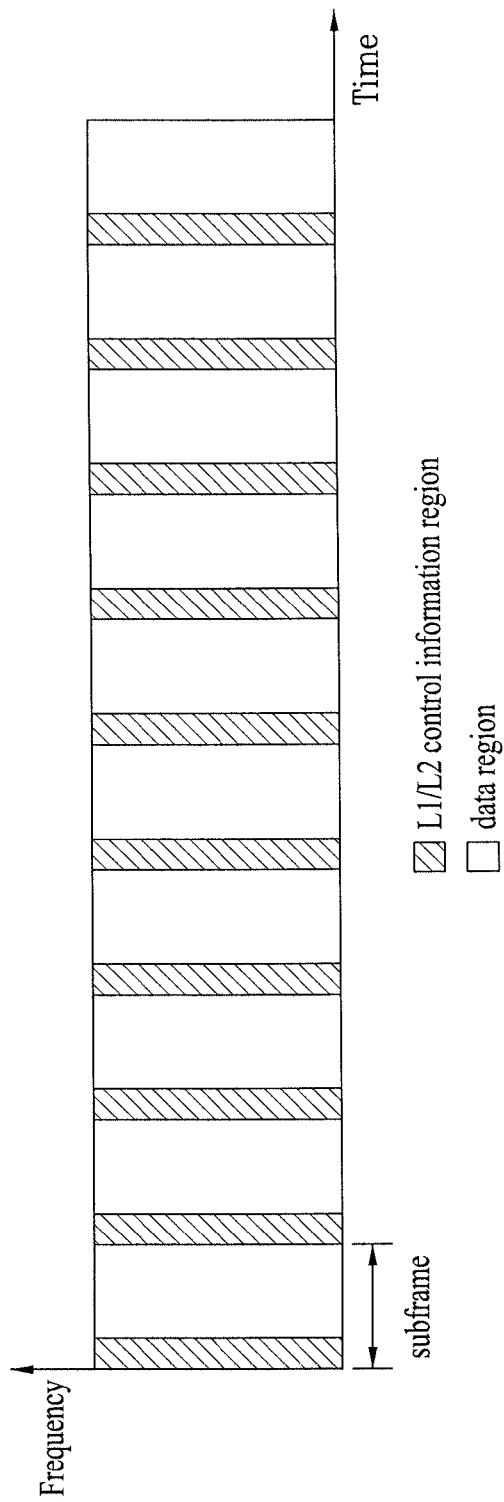
FIG. 1 is a diagram illustrating an example of a structure of a physical channel used in an E-UMTS (Evolved-Universal Mobile Telecommunications System)
Figure 2:
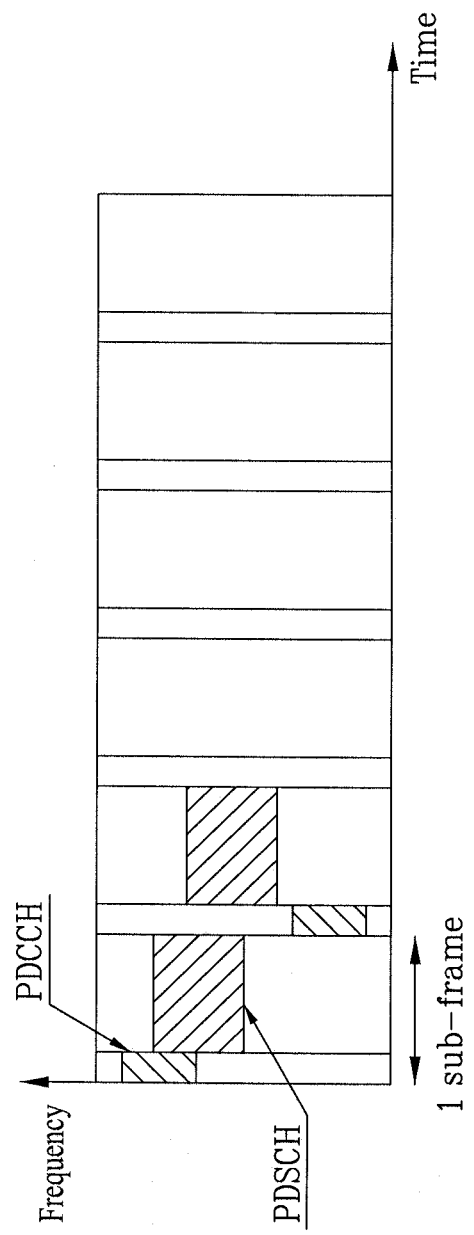
FIG. 2 is a diagram illustrating a general method of transmitting data in an E-UMTS.
Figure 3:
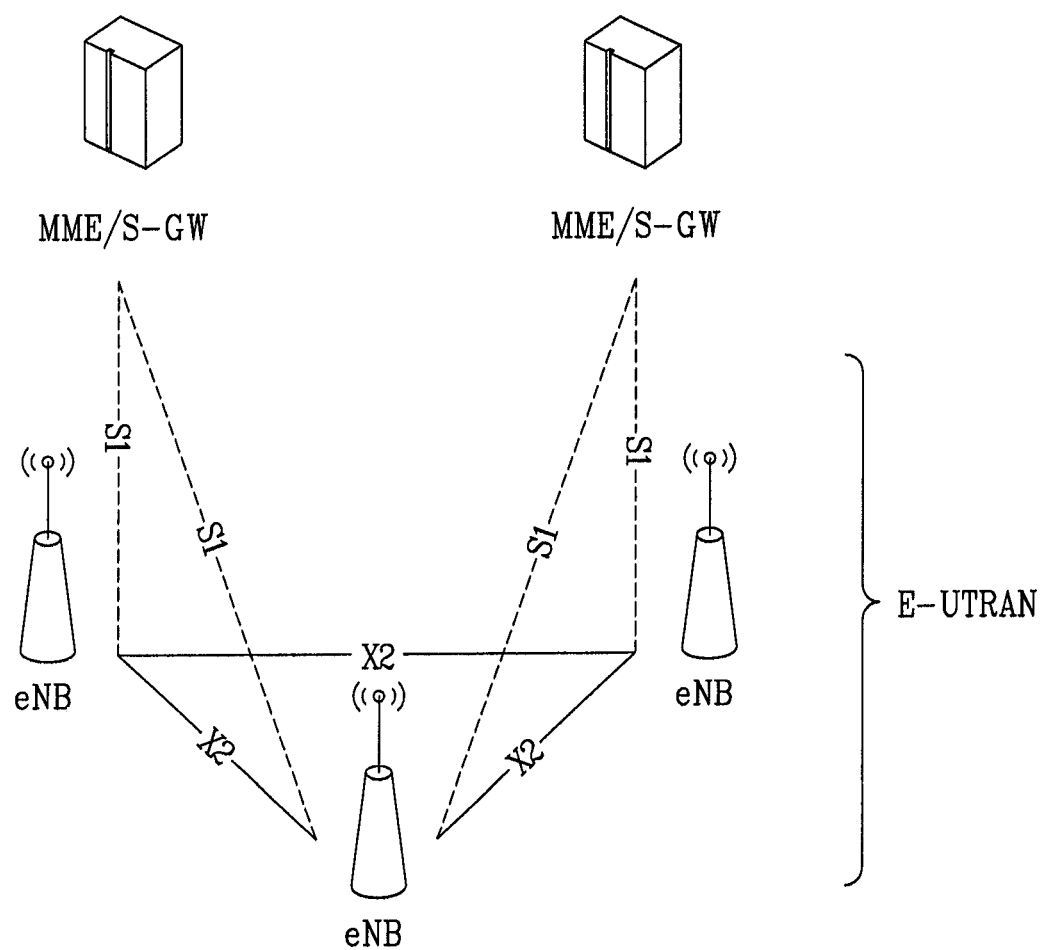
FIG. 3 is a diagram illustrating a network structure of an E-UMTS.

FIG. 3 illustrates a network structure of an E-UMTS. An E-UMTS is a system evolving from the conventional WCDMA UMTS and its basic standardization is currently handled by the 3GPP ($3^{rd}$ Generation Partnership Project). The E-UMTS can also be called an LTE (Long Term Evolution) system.

Referring to FIG. 3, an E-UTRAN includes base stations (hereinafter, referred to as 'eNode B' or 'eNB'), wherein respective eNBs are connected with each other through X2 interface. Also, each of eNBs is connected with a user equipment (UE) through a radio interface and connected with EPC (Evolved Packet Core) through S1 interface. The EPC includes a mobility management entity/system architecture evolution (MME/SAE) gateway.

Layers of a radio interface protocol between a user equipment and a network can be classified into a first layer L1, a second layer L2 and a third layer L3 based on three lower layers of OSI (open system interconnection) standard model widely known in communication systems. A physical layer belonging to the first layer L1 provides an information transfer service using a physical channel. A radio resource control (hereinafter, abbreviated as 'RRC') located at the third layer plays a role in controlling radio resources between the user equipment and the network. For this, the RRC layer enables RRC messages to be exchanged between the UE and the network. The RRC layer can be distributively located at network nodes including Node B, an AG and the like or can be independently located at either the Node B or the AG.

Figure 4:
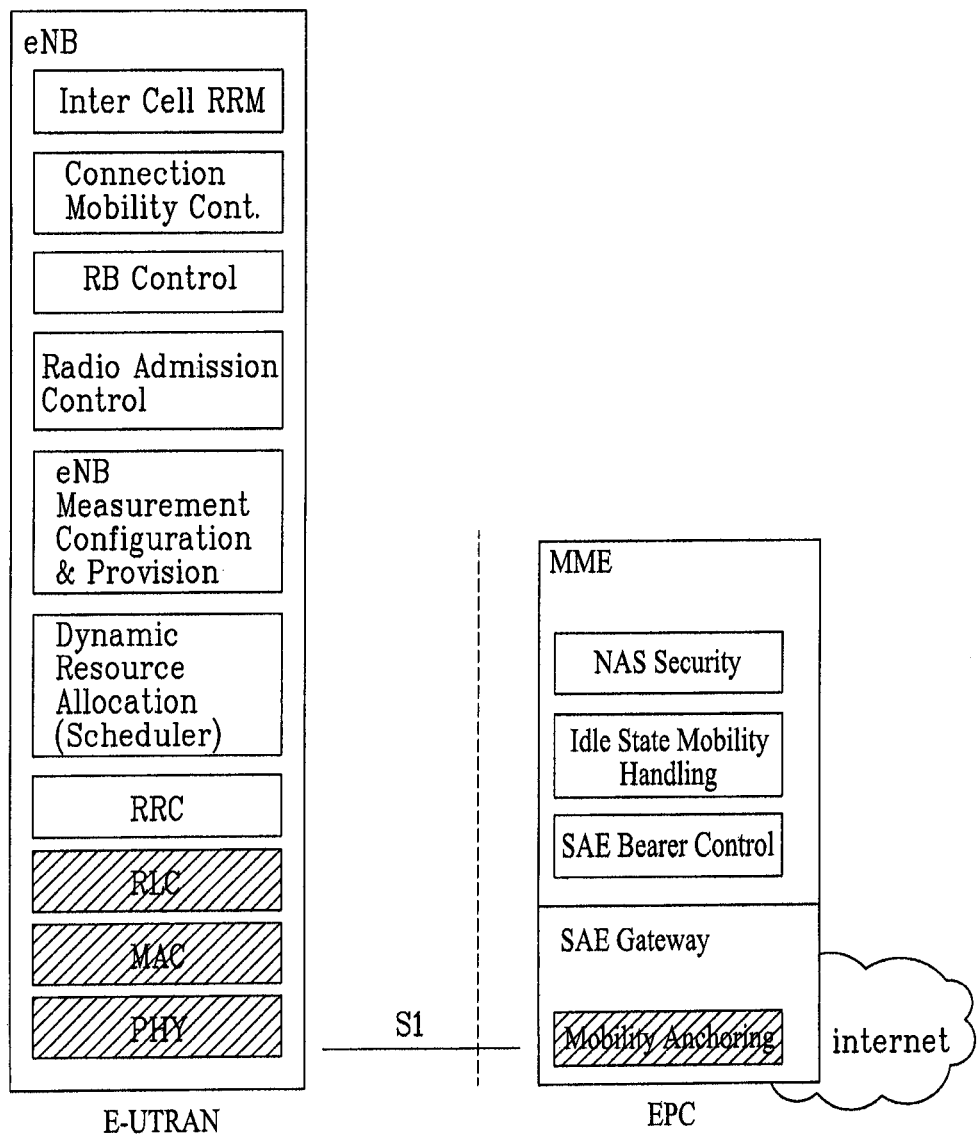
FIG. 4 is a schematic view illustrating an E-UTRAN (Evolved Universal Terrestrial Radio Access Network)

FIG. 4 is a schematic view illustrating an E-UTRAN (UMTS terrestrial radio access network). In FIG. 4, a hatching part represents functional entities of a user plane, and a non-hatching part represents functional entities of a control plane.

Figure 5A:
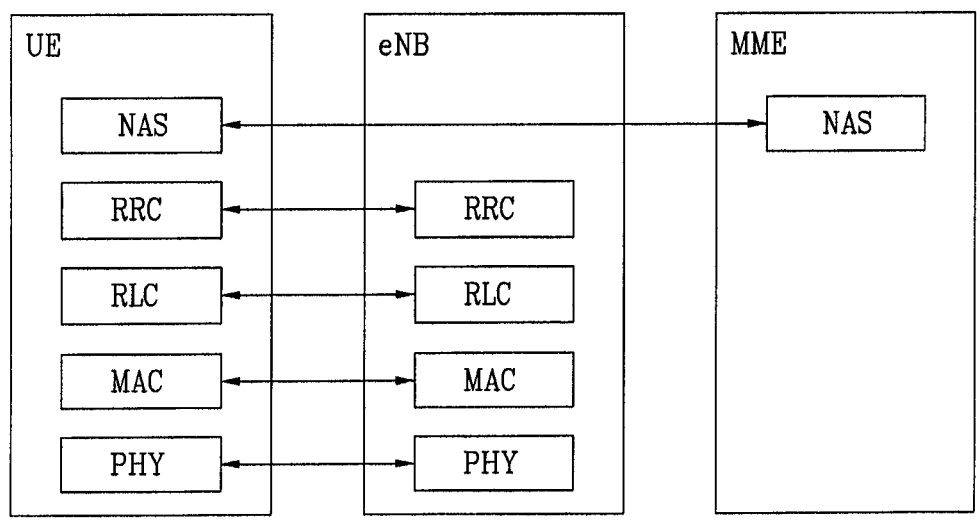
Figure 5B:
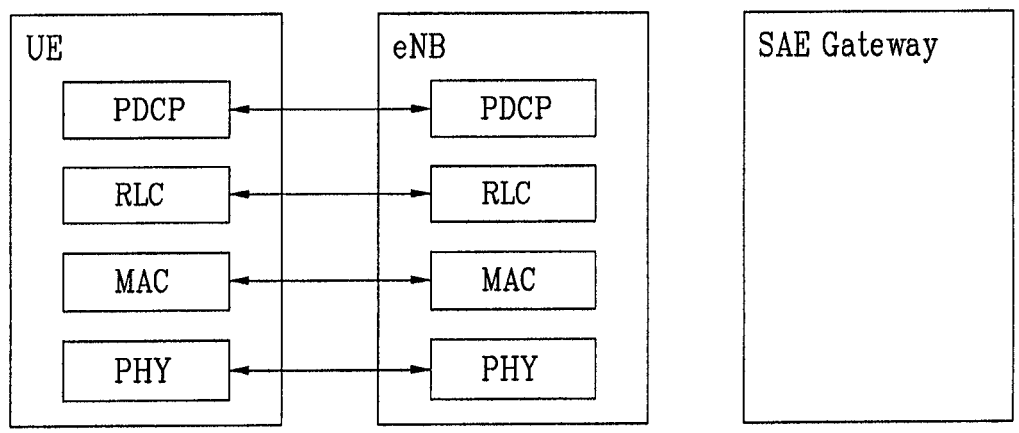

FIG. 5A and FIG. 5B illustrate a structure of a radio interface protocol between the user equipment (UE) and the E-UTRAN, in which FIG. 5A is a schematic view of a control plane protocol and FIG. 5B is a schematic view of a user plane protocol. Referring to FIG. 5A and FIG. 5B, a radio interface protocol horizontally includes a physical layer, a data link layer, and a network layer, and vertically includes a user plane for data information transfer and a control plane for signaling transfer. The protocol layers in FIG. 5A and FIG. 5B can be classified into L1 (first layer), L2 (second layer), and L3 (third layer) based on three lower layers of the open system interconnection (OSI) standard model widely known in the communications systems.

The physical layer as the first layer provides an information transfer service to an upper layer using physical channels. The physical layer (PHY) is connected to a medium access control (hereinafter, abbreviated as 'MAC') layer above the physical layer via transport channels. Data are transferred between the medium access control layer and the physical layer via the transport channels. Moreover, data are transferred between different physical layers, and more particularly, between one physical layer of a transmitting side and the other physical layer of a receiving side via the physical channels. The physical channel of the E-UMTS is modulated in accordance with an orthogonal frequency division multiplexing (OFDM) scheme, and time and frequency are used as radio resources.

The medium access control (hereinafter, abbreviated as 'MAC') layer of the second layer provides a service to a radio link control (hereinafter, abbreviated as 'RLC') layer above the MAC layer via logical channels. The RLC layer of the second layer supports reliable data transfer. In order to effectively transmit data using IP packets (e.g., IPv4 or IPv6) within a radio-communication period having a narrow bandwidth, a PDCP layer of the second layer (L2) performs header compression to reduce the size of unnecessary control information.

A radio resource control (hereinafter, abbreviated as 'RRC') layer located on a lowest part of the third layer is defined in the control plane only and is associated with configuration, reconfiguration and release of radio bearers (hereinafter, abbreviated as 'RBs') to be in charge of controlling the logical, transport and physical channels. In this case, the RB means a service provided by the second layer for the data transfer between the user equipment and the UTRAN.

As downlink transport channels carrying data from the network to the user equipments, there are provided a broadcast channel (BCH) carrying system information, a paging channel (PCH) carrying paging message, and a downlink shared channel (SCH) carrying user traffic or control messages. The traffic or control messages of a downlink multicast or broadcast service can be transmitted via the downlink SCH or an additional downlink multicast channel (MCH). Meanwhile, as uplink transport channels carrying data from the user equipments to the network, there are provided a random access channel (RACH) carrying an initial control message and an uplink shared channel (UL-SCH) carrying user traffic or control message.

As logical channels located above the transport channels and mapped with the transport channels, there are provided a broadcast control channel (BCCH), a paging control channel (PCCH), a common control channel (CCCH), a multicast control channel (MCCH), and a multicast traffic channel (MTCH).

In the E-UMTS system, an OFDM is used on the downlink and a single carrier frequency division multiple access (SC-FDMA) on the uplink. The OFDM scheme using multiple carriers allocates resources by unit of multiple sub-carriers including a group of carriers and utilizes an orthogonal frequency division multiple access (OFDMA) as an access scheme.

Figure 6:
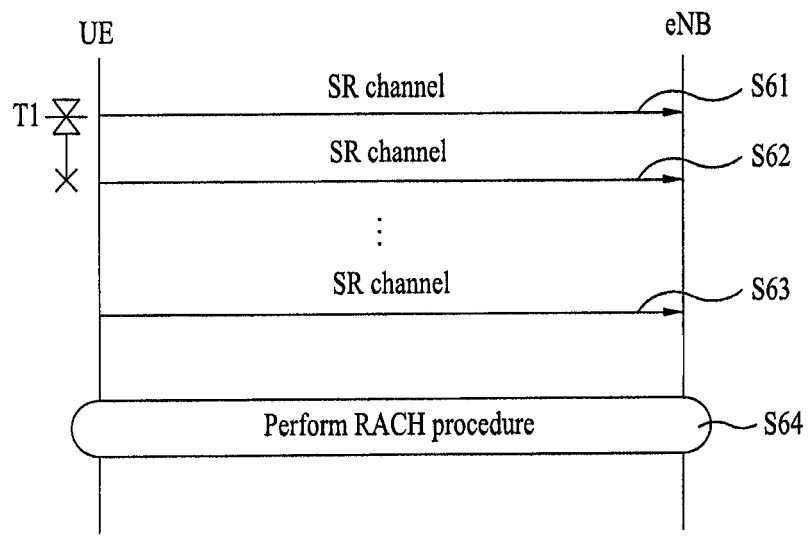
FIG. 6 is a flow chart illustrating a procedure according to one embodiment of the present invention.

FIG. 6 is a flow chart illustrating a procedure according to one embodiment of the present invention.

Referring to FIG. 6, a user equipment (UE) requests an eNode B (eNB) to allocate radio resources for uplink data transmission at least one time in accordance with a first radio resource allocation request mode. Then, if a predetermined condition which is previously set is satisfied, the UE requests the eNB to allocate the radio resources for uplink data transmission in accordance with a second radio resource allocation request mode.

In FIG. 6, the first radio resource allocation request mode is a radio resource allocation request mode using a scheduling request (SR) channel, and the second radio resource allocation request mode is a radio resource allocation request mode through a RACH procedure. However, the radio resource allocation request mode will not be limited to the above methods, and the first and second radio resource allocation request modes could be optional radio resource allocation request modes, respectively.

The SR channel is a physical layer channel used in the LTE system, and is comprised of 1 bit information. The UE which has been allocated with the SR channel from the eNB can request the eNB to allocate uplink radio resources by setting the SR channel to "1", for example. Since the SR channel is comprised of 1 bit information, error may occur during data transmission. Also, the SR channel can be used in a state that the UE is synchronized with the eNB. Accordingly, even though the UE has been allocated with the SR channel, if the UE is asynchronous with the eNB, the UE fails to successfully perform radio resource request through the SR channel.

Referring to FIG. 6, if data to be transmitted to the eNB are generated, the user equipment (UE) allocated with the SR channel from the eNB transmits the data to the eNB by setting the SR channel to "1" to request uplink radio resources [S61]. If the UE should perform a buffer status report (BSR) in a state that the UE is not allocated with uplink radio resources, the UE can use the SR channel. Also, if data having higher priority than data stored in the buffer are generated, the UE can use the SR channel. Moreover, in spite of uplink radio resources previously allocated to the UE, if data to be transmitted to the eNB are generated additionally or if buffer status is changed, the UE can transmit 1 bit information to the eNB through the SR channel.

After transmitting the 1 bit information through the SR channel, the UE makes a timer T1 operate. The driving time of the timer could be either the transmission time of the 1 bit information or the time when ACK for the 1 bit information is received. If the UE is not allocated with radio resources from the eNB until the timer ends, the UE transmits the 1 bit information to the eNB through the SR channel to request radio resource allocation [S62], and makes the timer operate again.

If the UE is allocated with uplink radio resources from the eNB as above, the UE terminates transmission of the 1 bit information and transmits uplink data to the eNB through the allocated radio resources. If the UE is not allocated with the radio resources from the eNB even after it repeats the above procedure a predetermined number of times which are previously set [S63], the user equipment performs a random access procedure (RACH procedure) to request the eNB to allocate the radio resources [S64]. In this case, the UE releases a call or notifies the eNB that an error has occurred together with or separately from the RACH procedure. The transmission period (or timer (T1) value) of the 1 bit information through the SR channel or the predetermined number of times can be reported to the UE in such a manner that it is included in system information or dedicated RRC message etc, which is previously transmitted from the eNB.

A modification example of FIG. 6 will be described below. In step S61, the UE makes the timer operate after transmitting the SR channel. The UE repeatedly transmits the SR channel until it is allocated with uplink channel resources before the timer ends. At this time, the SR channel can be transmitted periodically. If the UE is not allocated with uplink channel resources before the timer ends, the UE performs the RACH procedure to request allocation of uplink channel resources.

Figure 7:
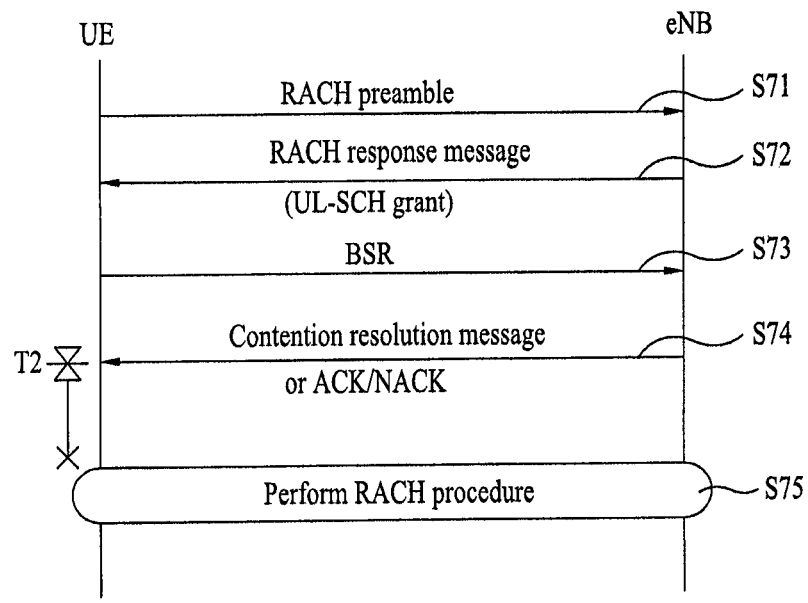
FIG. 7 is a flow chart illustrating a procedure according to another embodiment of the present invention.

FIG. 7 is a flow chart illustrating a procedure according to another embodiment of the present invention. According to the embodiment of FIG. 7, a user equipment (UE) performs a buffer status report (BSR) to an eNB.

Figure 8A:
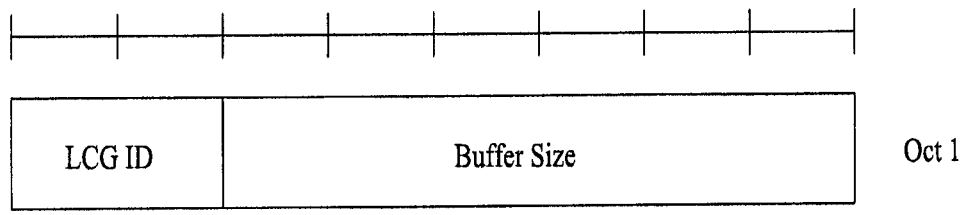
FIG. 8A and FIG. 8B illustrate data formats of a short BSR and a long BSR.
Figure 8B:
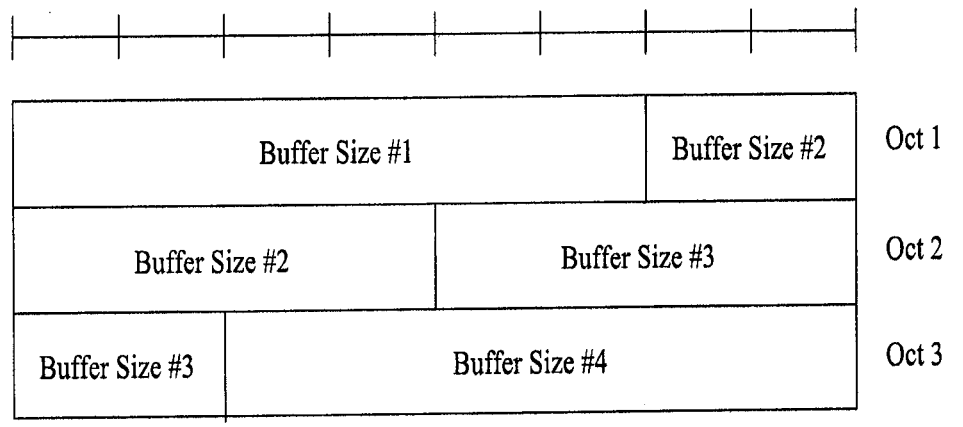

The BSR is performed so that the UE reports its buffer status to the eNB. FIG. 8A and FIG. 8B illustrate data formats of a short BSR and a long BSR, respectively. In FIG. 8A, LCG ID means a logical channel group identifier. The UE can group maximum four logical channels in one logical channel group and report buffer status of the logical channel group. In this way, if the buffer status report is performed for each logical channel group through grouping, overhead that may occur can be reduced. The eNB can notify the UE of the grouping method for the logical channels. The long BSR of FIG. 8B includes four buffer size fields corresponding to LCG ID #1 to LCG ID #4. Each buffer size field includes a size of all data, which are standby for transmission in the RLC layer and the PDCP layer included in the corresponding logical channel group.

The BSR of FIG. 8A or FIG. 8B can be included in MAC PDU (MAC protocol data unit) to be transmitted. Namely, the BSR is included in a BSR control element, which is one of control elements of a MAC PDU generated in the MAC layer.

Figure 9A:
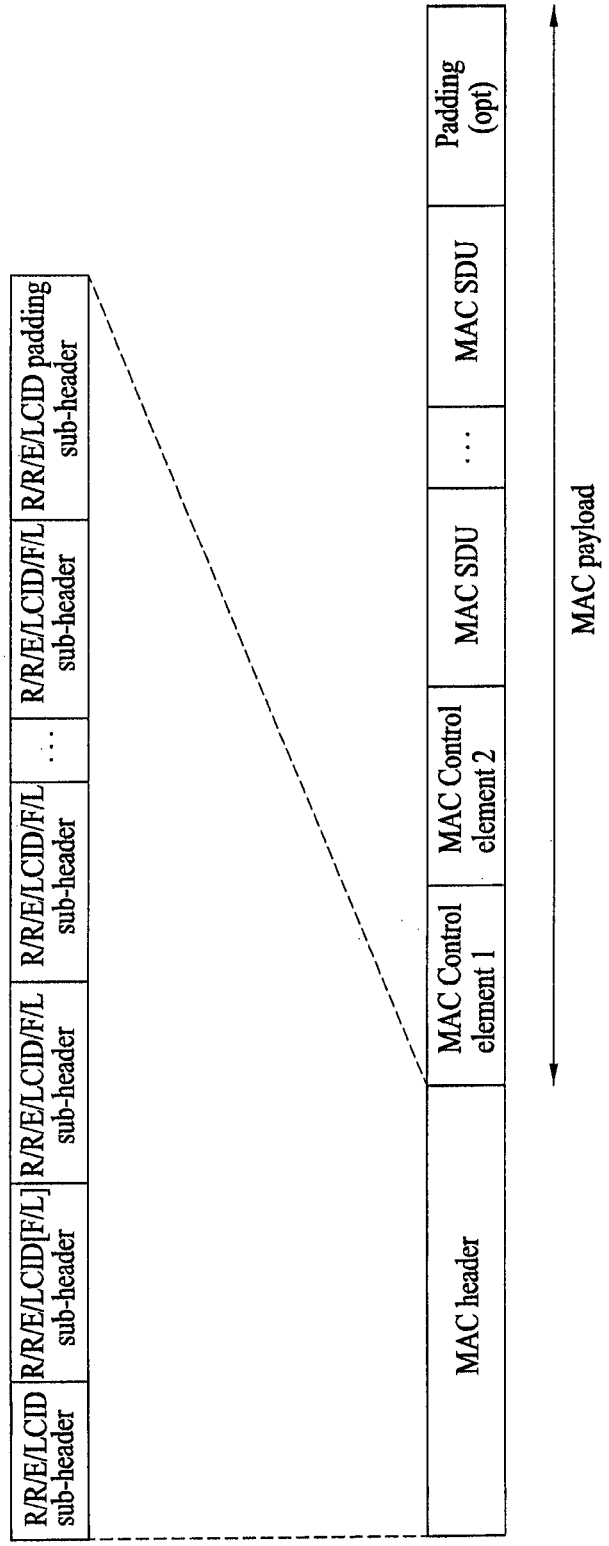
FIG. 9A to FIG. 9C are diagrams illustrating formats of MAC PDU.
Figure 9B:
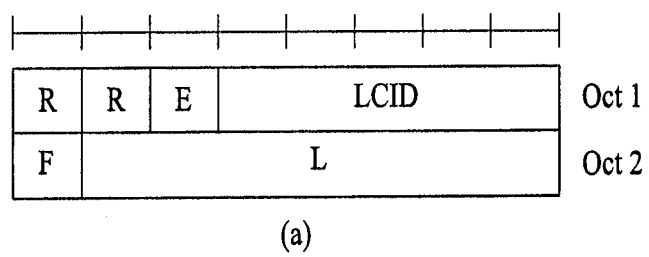
Figure 9B:
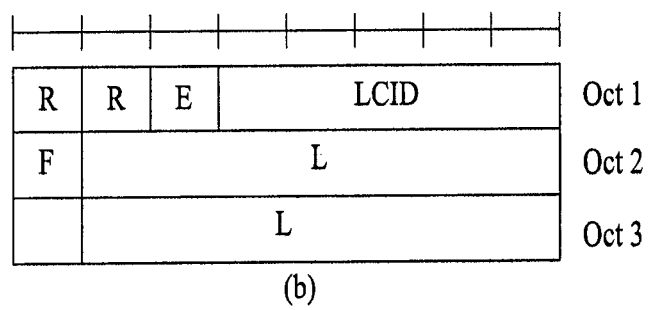
Figure 9C:
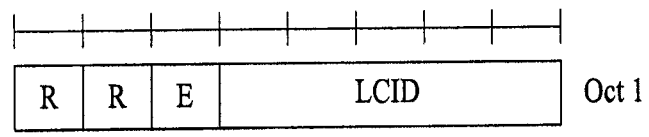

FIG. 9A to FIG. 9C are diagrams illustrating a format of the MAC PDU. In FIG. 9A to FIG. 9C, an LCID field includes information indicating a logical channel through which a corresponding MAC SDU (MAC service data unit) is transferred or a type of information in a corresponding MAC control element. An LCID field corresponding to a BSR control element identifies whether the corresponding BSR is a short BSR or a long BSR. An extension (E) field includes information indicating whether another MAC subheader follows right after a corresponding MAC subheader. An F field includes information indicating a length of an L field following the F field. A reserved (R) field is a field which is reserved.

If a certain condition is satisfied, the buffer status report procedure is triggered in the UE. At this time, if there are radio resources allocated to the UE, the UE transmits the BSR through the allocated radio resources. If there are no radio resources allocated to the UE and an SR channel has been established, the UE transmits 1 bit information to the eNB through the SR channel. If the SR channel has not been established, the UE transmits the BSR to the eNB via the RACH procedure. If the UE transmitting uplink data using allocated uplink radio resources shifts to a state in which there are no radio resources, the UE can perform the BSR transmission procedure using the SR channel or the RACH procedure. At this time, it is preferable that the BSR transmission procedure starts after a predetermined time elapses from the time when the UE identifies its buffer status. If the UE is allocated with radio resources from the eNB before the predetermined time elapses, the UE transmits the BSR through the allocated radio resources without performing the SR channel transmission procedure or the RACH procedure.

Referring to FIG. 7, if the MAC layer of the UE commands its physical layer to initiate the random access procedure, the physical layer of the UE first selects an access slot and a signature and then transmits a random access preamble to the eNB [S71].

If the UE transmits the preamble, the eNB transmits a response message through a downlink physical channel (for example, AICH (Acquisition indicator channel)) [S72]. In response to the preamble, a signature corresponding to the preamble is transmitted on the AICH for a first certain length of an access slot corresponding to the access slot to which the preamble is transmitted. The eNB allocates uplink radio resources (UL grant) to the UE through the RACH response message. The uplink radio resource is an uplink shared channel (UL-SCH). The UE transmits the MAC PDU, which includes the BSR, using the allocated radio resources, a message size, and a radio parameter included in the RACH response message [S73]. If the eNB receives the MAC PDU transmitted from the UE, the eNB transmits ACK/NACK or a contention resolution message to the UE [S74].

If it is identified that the MAC PDU, which includes the BSR, has been successfully transmitted, for example, if the UE receives ACK or a contention resolution message including an identifier of the UE from the eNB, the UE makes a timer (T2) operate. If the uplink radio resources are allocated from the eNB to the UE before the timer terminates, the UE transmits data stored in its buffer to the eNB by using the allocated radio resources.

If the UE is not allocated with the uplink radio resources from the eNB until the timer terminates, the UE realizes that the BSR transmission through the RACH procedure has been failed, and triggers a new BSR procedure. Namely, the UE performs the RACH procedure again [S75] to initiate BSR transmission. Otherwise, if the SR channel is established in the UE, the UE is allocated with radio resources by transmitting the 1 bit information through the established SR channel and then transmits the BSR through the allocated radio resources.

If the UE is informed from the eNB so as not to perform the BSR transmission procedure, the SR channel transmission procedure, or the RACH procedure any more, the UE terminates the timer (T2), or does not trigger the BSR transmission procedure even though the timer expires.

The embodiment of FIG. 7 will be described in more general. The UE transmits a first BSR to the eNB, wherein the first BSR indicates the buffer status of the UE. If the UE fails to receive allocation information until a predetermined time period, which is previously set, passes after successfully transmitting the first BSR, wherein the allocation information indicates allocation of radio resources for uplink data transmission, the UE triggers a transmission procedure of a second BSR. At this time, the transmission procedure of the second BSR can be performed through the RACH procedure or the transmission procedure of the SR channel. If the SR channel is periodically established in the UE, it is preferable that the UE performs the BSR transmission procedure using more quickly allocated radio resources among radio resources for RACH preamble transmission and radio resources for SR channel.

Figure 10:
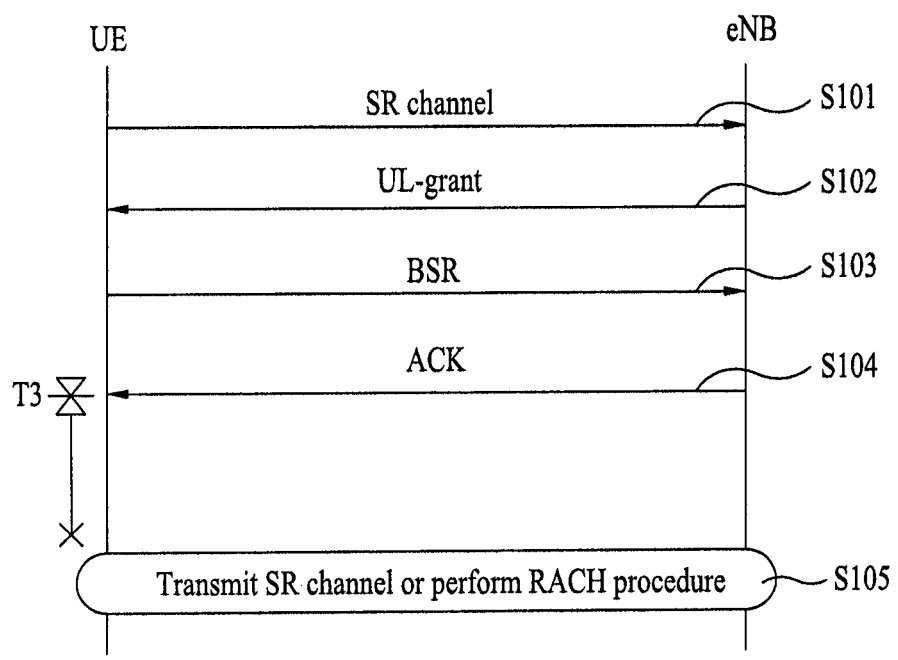
FIG. 10 is a flow chart illustrating a procedure according to still another embodiment of the present invention.

FIG. 10 is a flow chart illustrating a procedure according to another embodiment of the present invention.

Referring to FIG. 10, a user equipment (UE) transmits 1 bit information to an eNB (eNB) on an SR channel to perform a buffer status report (BSR) [S101]. If the eNB receives the 1 bit information from the UE through the SR channel, the eNB allocates uplink radio resources, for example, UL-SCH, to the UE [S102]. The UE transmits a MAC PDU including the BSR, to the eNB through the allocated radio resources [S103].

If the eNB successfully receives the MAC PDU, the eNB transmits ACK to the UE [S104]. If the UE receives ACK, the UE makes a timer (T3) operate and waits for allocation of uplink radio resources until the timer expires to transmit uplink data stored in its buffer. If the UE is allocated with uplink radio resources from the eNB before the timer expires, the UE transmits uplink data to the eNB through the allocated uplink radio resources. If the UE is not allocated with uplink radio resources from the eNB until the timer expires, the UE transmits the SR channel or the RACH procedure to perform the BSR procedure again [S105]. In FIG. 10, the UE may make the timer (T3) operate from the time when the UE transmits the BSR in step S103.

Figure 11:
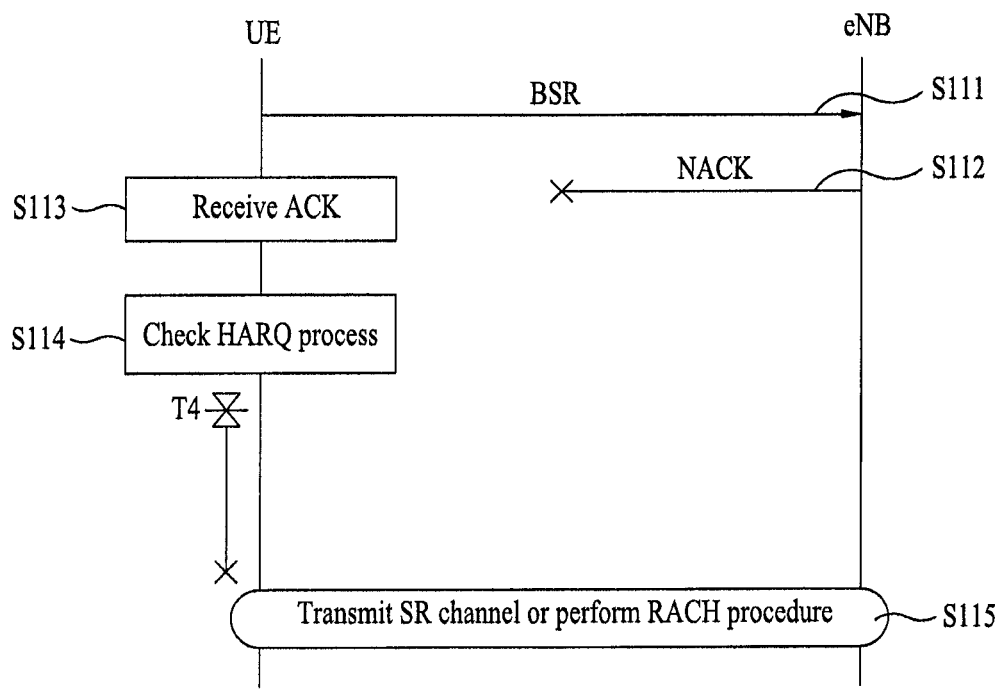
FIG. 11 is a flow chart illustrating a procedure according to further still another embodiment of the present invention.

FIG. 11 is a flow chart illustrating a procedure according to another embodiment of the present invention.

Referring to FIG. 11, a user equipment (UE) transmits a MAC PDU, which includes the BSR, to an eNB through an SR channel, the RACH procedure, or the previously allocated uplink radio resources [S111]. If the eNB fails to successfully receive the MAC PDU transmitted from the UE, the eNB transmits NACK to the UE [S112]. If an error occurs during the transmission procedure of NACK, the UE receives ACK [S112]. Although the UE determines that it has successfully transmitted the BSR and waits for allocation of uplink radio resources, since the eNB has been failed to successfully receive the BSR, the uplink radio resources are not allocated to the UE actually. Alternatively, even though the eNB has successfully received the BSR, if there are no available radio resources, the eNB does not allocate radio resources to the UE.

In this case, the UE checks whether there are radio resources allocated to all HARQ processes established in the UE [S114], and drives a timer (T4) if there are no radio resources allocated to the HARQ processes. If the UE is allocated with radio resources from the eNB before the timer expires, the UE terminates the timer. If the UE is not allocated with radio resources from the eNB until the timer expires, the UE transmits 1 bit information through the SR channel or triggers the buffer status report (BSR) by performing the RACH procedure [S115].

In the embodiment of FIG. 11, that there are radio resources allocated to a specific HARQ process means that data to be transmitted to the eNB remain in a HARQ buffer of the corresponding HARQ process. Alternatively, that there are radio resources allocated to the specific HARQ process means that, after radio resources for initial data transmission are allocated to the HARQ process, retransmission does not occur in the HARQ process as much as the maximum number of retransmission times and feedback most recently received with respect to the HARQ process is NACK. Or, that there are radio resources allocated to the specific HARQ process may mean that radio resources for initial data transmission are allocated to the HARQ process.

According to another embodiment of the present invention, it is considered that an SR channel is used for another purpose. Namely, although the SR channel is used to request allocation of radio resources to an eNB, if a predetermined event occurs, a UE can report its status to the eNB by transmitting the 1 bit information to the eNB through the SR channel even though there are radio resources allocated from the eNB. Alternatively, the UE can use the SR channel to transmit a response message to a radio resource allocation message transmitted from the eNB. For the above examples, in addition to the SR channel, another physical channel of at least 1 bit or greater information can be established.

An example of the predetermined event corresponds to a status where data to be transmitted to the eNB do not remain in the buffer of the UE any more in a state that there are radio resources allocated to the UE.

Another example of the predetermined event corresponds to a status where a radio bearer, which does not satisfy quality of service (QoS), exists in the UE. For example, a maximum bit rate (MBR) or a prioritized bit rate (PBR) can be set per logical channel of the UE. In this case, if MBR or PBR set with respect to a specific radio bearer is not satisfied, the UE can report it through the SR channel. The MBR means an amount of maximum data that can be transmitted to a lower layer per transmission time interval (TTI) for each logical channel, and the PBR means an amount of minimum data.

Other example of the predetermined event corresponds to a status where data of a specific logical channel designated by the eNB arrive in the buffer. Namely, if data of a specific logical channel designated by the eNB are generated in the UE, the UE can report it to the eNB through the SR channel.

Another embodiment of the present invention will be described below. Since an SR channel is a channel of 1 bit information, even though the UE has neither requested allocation of radio resources through the SR channel nor transmitted the BSR, the eNB may misunderstand that it has received the 1 bit information for channel resource request through the SR channel, due to error occurred during the transmission procedure. In this case, the eNB transmits an allocation message of uplink radio resources to the UE. If the UE receives the allocation message of uplink radio resources from the eNB, the UE transmits the BSR using the allocated radio resources. Meanwhile, if an extra space exists in the MAC PDU, which includes the BSR, the UE can transmit RRC measurement report or RLC status report to the eNB. In this case, the RRC measurement report and the RLC status report are transmitted in such a manner that they are included in the MAC PDU.

The aforementioned embodiments are achieved by combination of structural elements and features of the present invention in a predetermined type. Each of the structural elements or features should be considered selectively unless specified otherwise. Each of the structural elements or features may be carried out without being combined with other structural elements or features. Also, some structural elements and/or features may be combined with one another to constitute the embodiments of the present invention. The order of operations described in the embodiments of the present invention may be changed. Some structural elements or features of one embodiment may be included in another embodiment, or may be replaced with corresponding structural elements or features of another embodiment. Moreover, it will be apparent that some claims referring to specific claims may be combined with another claims referring to the other claims other than the specific claims to constitute the embodiment or add new claims by means of amendment after the application is filed.

The embodiments of the present invention have been described based on data transmission and reception between the eNB and the UE. A specific operation which has been described as being performed by the eNB may be performed by an upper node of the eNB as the case may be. In other words, it will be apparent that various operations performed for communication with the UE in the network which includes a plurality of network nodes along with the eNB may be performed by the eNB or network nodes other than the eNB. The eNB may be replaced with terms such as a fixed station, base station, Node B, eNode B, and access point. Also, the user equipment (UE) may be replaced with terms such as mobile station (MS) and mobile subscriber station (MSS).

The embodiments according to the present invention may be implemented by various means, for example, hardware, firmware, software, or their combination. If the embodiment according to the present invention is implemented by hardware, the embodiment of the present invention may be implemented by one or more application specific integrated circuits (ASICs), digital signal processors (DSPs), digital signal processing devices (DSPDs), programmable logic devices (PLDs), field programmable gate arrays (FPGAs), processors, controllers, microcontrollers, microprocessors, etc.

If the embodiment according to the present invention is implemented by firmware or software, the method of transmitting and receiving data in the wireless communication system according to the embodiment of the present invention may be implemented by a type of a module, a procedure, or a function, which performs functions or operations described as above. A software code may be stored in a memory unit and then may be driven by a processor. The memory unit may be located inside or outside the processor to transmit and receive data to and from the processor through various means which are well known.

It will be apparent to those skilled in the art that the present invention can be embodied in other specific forms without departing from the spirit and essential characteristics of the invention. Thus, the above embodiments are to be considered in all respects as illustrative and not restrictive. The scope of the invention should be determined by reasonable interpretation of the appended claims and all change which comes within the equivalent scope of the invention are included in the scope of the invention.

INDUSTRIAL APPLICABILITY

The present invention can be used in a wireless communication system such as a mobile communication system or a wireless Internet system.

What is claimed is:

1. A method of requesting allocation of radio resources at a user equipment (UE) in a wireless communication system, the method comprising:
    receiving, from a base station, a radio resource control (RRC) message which includes a pre-defined number of times for the UE to transmit a scheduling request (SR) to the base station;
    determining whether or not the UE has first allocated uplink radio resources for data transmission;
    if the UE has the first allocated uplink radio resources, transmitting the first buffer status report to the base station using the first allocated uplink resources;
    determining whether or not the UE has a SR channel configured for transmission of a scheduling request (SR) if the UE does not have the first allocated uplink radio resources;
    if the UE has the SR channel, transmitting the scheduling request (SR) to the base station to request allocation of second uplink radio resources for transmission of the first buffer status report, the scheduling request (SR) transmitted the pre-defined number of times until the second uplink radio resources are allocated by the base station;
    performing a first random access procedure to request the allocation of the second uplink radio resources, if the UE does not have the SR channel or if the requested second uplink radio resources have not been allocated even after the scheduling request (SR) is transmitted the pre-defined number of times, wherein performing the first random access procedure comprises:
        transmitting a random access preamble to the base station;
        receiving a random access response message from the base station, the random access response message including information about the second uplink radio resources;
        transmitting the first buffer status report to the base station through the second uplink radio resources; and
        receiving a contention resolution message from the base station, the contention resolution message including an identifier of the user equipment;
    starting a timer after receiving the contention resolution message to check whether third uplink radio resources are allocated or not;
    initiating transmission of a second buffer status report by performing a second random access procedure or sending another SR channel, if the third uplink radio resources are not allocated until the timer expires; and
    receiving indication information from the base station, the indication information instructing the user equipment to stop transmitting any buffer status report, SR channel or random access preamble,
    wherein the user equipment stops transmitting any buffer status report, SR channel or random access preamble after receiving the indication information.

2. The method of claim 1, wherein the UE terminates the transmission of the scheduling request (SR), if the UE is allocated the uplink radio resources while transmitting the scheduling request (SR) the pre-defined number of times.

3. The method of claim 1, wherein the scheduling request (SR) is 1-bit information.

4. The method of claim 1, wherein the first buffer status report is included in a medium access control protocol data unit (MAC PDU) to be transmitted to the base station,
    wherein the first buffer status report is either a short buffer status report or a long buffer status report, wherein the short buffer status report comprises one buffer size field for indicating an amount of data of one logical channel group, and the long buffer status report comprises four buffer size fields for indicating an amount of data of four logical channel groups, and wherein a logical channel group includes maximum four logical channels,
    wherein a header of the MAC PDU comprises an identifier which indicates whether the first buffer status report is either the short buffer status report or the long buffer status report.

* * * * *